United States Patent
Zhou et al.

(10) Patent No.: US 12,505,311 B2
(45) Date of Patent: Dec. 23, 2025

(54) HALLUCINATION DETECTION AND HANDLING FOR A LARGE LANGUAGE MODEL BASED DOMAIN-SPECIFIC CONVERSATION SYSTEM

(71) Applicant: Robert Bosch GmbH, Stuttgart (DE)

(72) Inventors: Zhengyu Zhou, Fremont, CA (US); Arsalan Gundroo, San Francisco, CA (US)

(73) Assignee: Robert Bosch GmbH, Stuttgart (DE)

( * ) Notice: Subject to any disclaimer, the term of this patent is extended or adjusted under 35 U.S.C. 154(b) by 210 days.

(21) Appl. No.: 18/452,298

(22) Filed: Aug. 18, 2023

(65) Prior Publication Data
US 2025/0061286 A1 Feb. 20, 2025

(51) Int. Cl.
*G06F 40/40* (2020.01)
*G06F 16/3329* (2025.01)
*G06F 40/205* (2020.01)

(52) U.S. Cl.
CPC .......... *G06F 40/40* (2020.01); *G06F 16/3329* (2019.01); *G06F 40/205* (2020.01)

(58) Field of Classification Search
None
See application file for complete search history.

(56) References Cited

U.S. PATENT DOCUMENTS

| | | | | |
|---|---|---|---|---|
| 4,914,590 | A * | 4/1990 | Loatman | G06F 40/35 704/8 |
| 11,508,372 | B1 * | 11/2022 | Schwartz | G10L 15/22 |
| 11,605,376 | B1 * | 3/2023 | Hoover | G10L 15/22 |
| 2008/0140387 | A1 * | 6/2008 | Linker | G06F 40/40 704/E15.001 |

(Continued)

OTHER PUBLICATIONS

Ouyang, Long et al., "Training language models to follow instructions with human feedback", 36th Conference on Neural Information Processing Systems (NeurIPS 2022), 15 pages.

(Continued)

*Primary Examiner* — Peter Vincent Agustin
(74) *Attorney, Agent, or Firm* — Maginot, Moore & Beck LLP

(57) ABSTRACT

Systems and methods are described herein for detecting and reducing hallucinations and improving the reliability of an LLM-based QA system. Particularly, the disclosure provides a set of hallucination detection and handling approaches that address different types of hallucinations of the QA system. The hallucination detection approaches described herein include comparing a natural language answer with context information by way of sentence similarity estimation and keyword matching. The hallucination handling approaches described herein include removing hallucinated sentences from the natural language answer or regenerating the natural language answer using better context information, depending on a level of hallucination detected in the natural language answer. A hybrid framework is also provided that systematically combines the hallucination detection approaches and hallucination handling approaches into one system to achieve an optimal hallucination-reduction performance for the QA system.

20 Claims, 10 Drawing Sheets

(56) References Cited

U.S. PATENT DOCUMENTS

| | | | | |
|---|---|---|---|---|
| 2013/0297293 | A1* | 11/2013 | Di Cristo | G06F 40/35 |
| | | | | 704/9 |
| 2018/0189267 | A1* | 7/2018 | Takiel | G10L 15/19 |
| 2019/0327330 | A1* | 10/2019 | Natarajan | G06F 16/248 |
| 2021/0049476 | A1* | 2/2021 | Davis | G06N 5/02 |
| 2021/0056970 | A1* | 2/2021 | Jain | G06F 16/243 |
| 2021/0158175 | A1* | 5/2021 | Trim | G06N 5/01 |
| 2023/0359654 | A1* | 11/2023 | Johannhoerster | G06N 5/041 |
| 2023/0419051 | A1* | 12/2023 | Sabapathy | G06F 40/30 |
| 2024/0378399 | A1* | 11/2024 | Gandhi | G06F 16/345 |
| 2025/0061286 | A1* | 2/2025 | Zhou | G06F 40/30 |

OTHER PUBLICATIONS

Thoppilan, Romal et al., "LaMDA: Language Models for Dialog Applications", arXiv:2201.08239v3 [cs.CL] Feb. 10, 2022, 47 pages.

Touvron, Hugo et al., "LLaMA: Open and Efficient Foundation Language Models", arXiv:2302.1397v1 [cs/CL] Feb. 27, 2023, 27 pages.

Ji, Ziwei et al., "Survey of Hallucination in Natural Language Generation", ACM Computing Surveys, vol. 1, No. 1, Publication Date: Feb. 2022, 47 pages.

Chen, Sihao et al., "Improving Faithfulness in Abstractive Summarization with Contrast Candidate Generation and Selection", arXiv:2104.09061v1 [cs/CL] Apr. 19, 2021, 7 pages.

Manakul, Potsawee et al., "Selfcheckgpt: Zero-Resource Black-Box Hallucination Detection for Generative Large Language Models", arXiv:2303.08896v2 [cs/CL] May 8, 2023, 13 pages.

Shuster, Kurt et al., Retrieval Augmentation Reduces Hallucination in Conversation, arXiv:2104.07567v1 [cs/CL] Apr. 15, 2021, 21 pages.

Zhou, Chunting et al., "Detecting Hallucinated Content in Conditional Neural Sequence Generation", arXiv:2011.02593v3 [cs/CL] Jun. 2, 2021, 16 pages.

Wan, David et al., "Faithfulness-Aware Decoding Strategies for Abstractive Summarization", arXiv:2303.03278v1 [cs/CL] Mar. 6, 2023, 17 pages.

Huang, Kung-Hsiang et al., "Swing: Balancing Coverage and Faithfulness for Dialogue Summarization", arXiv:2301.10483v1 [cs/CL] Jan. 25, 2023, 14 pages.

Reimers, Nils et al., "Sentence-BERT: Sentence Embeddings using Siamese BERT-Networks", arXiv:1908.10084v1 [cs/CL] Aug. 27, 2019, 11 pages.

Firoozeh, Nazanin et al., "Keyword extraction: Issues and methods", Natural Language Engineering, 2019, 33 pages.

* cited by examiner

10

Given the context: Introducing Voice Recognition Start using the Voice Recognition with ...
Answer the following question: how do I activate the voice recognition system in my vehicle?

20

To activate the voice recognition system, press and hold the VR button on your steering wheel for a few seconds until you hear a beep. Alternatively, you can also say "Hey system" or "Hey car" to activate the system. Once the system is activated, you can use voice commands to control various features of your vehicle, such as making phone calls, adjusting the temperature, and navigating to a destination.

FIG. 1

Sentence Similarity-Based Hallucination Detection Algorithm:

```
for each sentence in the answer (denoted as sen_A):
    for each sentence in the Context (denoted as sen_C):
        if the sentence-embedding based approach assigns a similarity score larger than
        Threshold_A:
            sen_A and sen_C are deemed as similar.
        elif the pattern-overlapping-rate based approach assigns an overlapping rate larger than
        Theshold_B:
            sen_A and sen_C are deemed as similar.
        else:
            sen_A and sen_C are deemed as unsimilar.
    if sen_A is not similar to any of the sentences in the Context:
        sen_A is labeled as hallucinated.
```

FIG. 5

Keyword-Based Hallucination Detection Algorithm:

Extract the keywords from the answer with a state-of-the-art keyword-extraction technique.
for each keyword in the extracted keywords:
    if the keyword does NOT occur in the Context (i.e., retrieval result):
        The keyword is labeled as a hallucinated keyword.
if the ratio of number of hallucinated keywords and number of total keywords is larger than a threshold:
    The answer is deemed as heavily hallucinated.

FIG. 6

Sentence Similarity-Based Hallucination Handling Algorithm:

Given a user query:
Run the QA system with a baseline retriever to generate an answer.
while hallucination is detected for the generated answer (using the Sentence Similarity-Based Hallucination Detection Algorithm):
    if the number of hallucinated sentences is <= 30% of total sentence number for the answer:
        Remove those hallucinated sentence from the answer → Output final answer & Program ends.
    else:
        if there is a better information retrieval method available:
            Rerun the QA system with the better retriever and continue the loop.
        else:
            Remove those hallucinated sentence from the answer → Output final answer & Program ends.

FIG. 7

Keyword-Based Hallucination Handling Algorithm:

Given a user query:
Run the QA system with a baseline retriever to generate an answer.
while hallucination is detected for the generated answer (using the Keyword-Based Hallucination Detection Algorithm):
    if there is a better information retrieval method available:
        Rerun the QA system with the better retriever and continue the loop.
    else:
        Output final answer & Program ends.

FIG. 8

Answer Support Determination Algorithm:

for each sentence in the answer (denoted as sen_A):
    for each sentence in the Context (denoted as sen_C):
        if the sentence-embedding based approach assigns a similarity score larger than Threshold_A:
            sen_C is deemed as a supporting sentence for the answer (supporting sen_A).
        elif the pattern-overlapping-rate based approach assigns an overlapping rate larger than Theshold_B:
            sen_C is deemed as a supporting sentence for the answer (supporting sen_A).
Output the sentences in the Context deemed as supporting sentences.

FIG. 10

HALLUCINATION DETECTION AND HANDLING FOR A LARGE LANGUAGE MODEL BASED DOMAIN-SPECIFIC CONVERSATION SYSTEM

FIELD

The device and method disclosed in this document relates to machine learning and, more particularly, to hallucination detection and handling for large language model based conversation systems.

BACKGROUND

Unless otherwise indicated herein, the materials described in this section are not admitted to be the prior art by inclusion in this section.

Large Language Models (LLMs) have become a recent focus of artificial intelligence and have been used in many applications. LLMs, such as ChatGPT, have been found especially effective for the development of conversation systems such as question-answering (QA) systems. LLMs are trained on enormous amounts of training data and typically with multiple natural language processing-related training objectives. The use of LLMs significantly improves the performance of down-stream conversation tasks. Particularly, LLMs enable systems to better understand a user's input, learn richer knowledge and better natural language processing capabilities (e.g., in coreference resolution, in summarization, etc.). Additionally, LLMs enable systems to generate more natural and higher-quality responses. Compared to the previous state-of-the-art technology, the recently developed LLM based conversation systems (e.g., ChatGPT, GPT4) can understand a user's intent more accurately and generate much more intelligent conversations with user.

However, LLMs still have a number of weaknesses. One major issue with LLMs is the so-called "hallucination" problem. The hallucination problem can be generally understood as the phenomenon in which, given an inquiry from user, the LLM generates an answer that includes untruthful or "hallucinated" information. In other words, the LLM may make up some content in its answer that is not based on facts, but instead included to make the answer seem more probable. The hallucination problem is especially critical for domain-specific conversation applications (e.g., conversation assistant for vehicle repairment operations, cooking assistant involving stove/oven operations), where reliability is often a key factor affecting the user's satisfaction with the system. Moreover, the hallucinated content in answers provided by LLM-based system may cause create significant liability issues (e.g., may cause damage or injury) for those applications requiring high reliability.

Various approaches have been proposed to relieve the hallucination problem of LLM-based natural language generation. For a domain-specific QA system, one effective way to improve the system's reliability is to leverage information retrieval to improve question answering. That is, given a question from the user, instead of only relying on the LLM to generate answer for the question, we can first conduct information retrieval to find relevant domain-specific information for the given question, and then ask the LLM to generate a constrained answer based on the retrieval result (s). In this way, the reliability can be significantly improved as the answer generated by LLM will be largely grounded by the retrieved domain-specific content. However, even with information retrieval added to the LLM-based domain-specific QA system, the hallucination problem will still occur from time to time, typically due to imperfect information retrieval or due to previously learned knowledge (learned during the training of the LLM) being too strong. What is needed is an approach that further reduces the hallucinations and improves the reliability of LLM-based domain-specific QA to a satisfactory level.

SUMMARY

A method of answering natural language questions is disclosed. The method comprises receiving, with a processor, a natural language question. The method further comprises retrieving, with the processor, natural language context information from an information source using a first information retrieval technique based on the natural language question. The method further comprises generating, with the processor, a natural language answer using a language model based on the natural language question and the natural language context information. The method further comprises detecting, with the processor, hallucinated content in the natural language answer based on the natural language context information.

BRIEF DESCRIPTION OF THE DRAWINGS

The foregoing aspects and other features of the systems and methods are explained in the following description, taken in connection with the accompanying drawings.

FIG. 1 shows an example query and answer generated by a domain-specific, LLM-based QA system.

FIG. 5 shows pseudocode that summarizes the sentence similarity-based hallucination detection technique.

FIG. 6 shows pseudocode that summarizes the keyword-based hallucination detection technique.

FIG. 7 shows pseudocode that summarizes the sentence similarity-based hallucination handling technique.

FIG. 8 shows pseudocode that summarizes the keyword-based hallucination handling technique.

FIG. 10 shows pseudocode that summarizes the sentence similarity-based hallucination handling technique.

DETAILED DESCRIPTION

Figure 2:
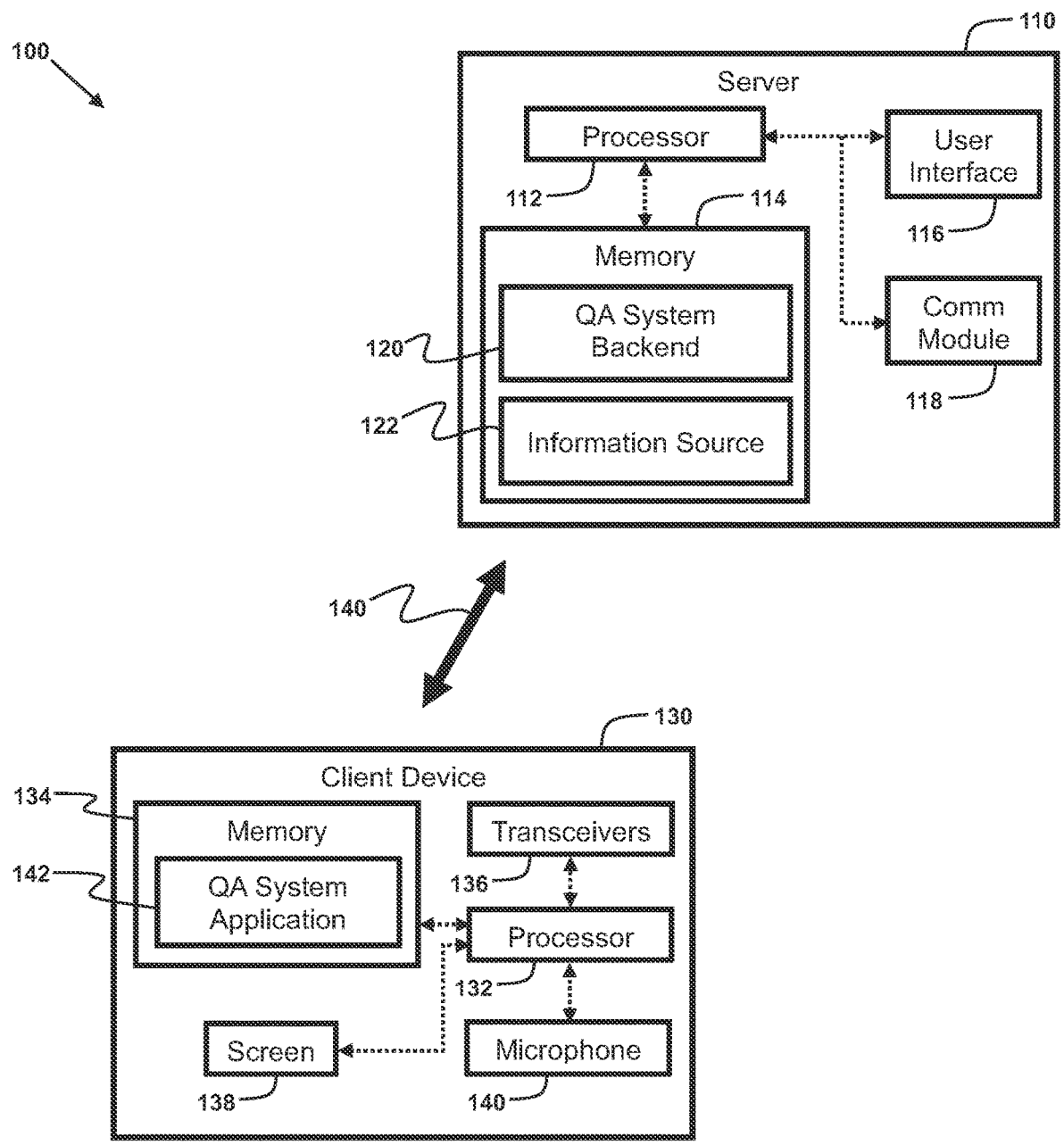
FIG. 2 shows an exemplary embodiment of a domain-specific, LLM-based QA system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Overview

Systems and methods are described herein for detecting and reducing hallucinations and improving the reliability of an LLM-based QA system. Particularly, the disclosure provides a set of hallucination detection and handling approaches that address different types of hallucinations of the QA system. The hallucination detection approaches described herein include comparing a natural language answer with context information by way of sentence similarity estimation and keyword matching. The hallucination handling approaches described herein include removing hallucinated sentences from the natural language answer or regenerating the natural language answer using better context information, depending on a level of hallucination detected in the natural language answer. A hybrid framework is provided that systematically combines the hallucination detection approaches and hallucination handling approaches into one system to achieve an optimal hallucination-reduction performance for the QA system.

FIG. 1 shows an example prompt and answer generated by a domain-specific, LLM-based QA system. A user provides a natural language question (e.g., "How do I activate the voice recognition system?") that relates the particular domain of operating an in-car infotainment system. The QA system retrieves context information including natural language text (e.g., "Introducing Voice Recognition Start using Uconnect Voice Recognition with . . . ") from one or more domain-specific resources (e.g., a user manual or webpages for the car or for the in-car infotainment system).

Next, the QA system constructs a prompt 10 (e.g., "Given the context: Introducing Voice Recognition Start using the Voice Recognition with . . . Answer the following question: how do I activate the voice recognition system in my vehicle?") that includes both the natural language question and the natural language context information. The prompt 10 is fed into the LLM (e.g., OpenAI GPT) of the QA system as the input. The LLM of the QA system generates a natural language answer based on the prompt 10 (e.g., "To activate the voice recognition system, press and hold the VR button on your steering wheel for a few seconds until you hear a beep. Alternatively, you can also say "Hey system" or "Hey car" to activate the system. Once the system is activated, you can use voice commands to control various features of your vehicle, such as making phone calls, adjusting the temperature, and navigating to a destination.").

Although feeding the context information into the LLM of the QA system will help reduce hallucinations in the generated natural language answer, such hallucinations by the LLM are unlikely to be totally avoided and may still occur from time to time. For example, in the illustrated example answer, both the $2^{nd}$ and the $3^{rd}$ sentences are hallucinated, i.e., not mentioned or supported by the provided context information. Conventional QA systems would, nonetheless, simply output as the generated natural language answer from the QA system to the user. However, the QA system according to the disclosure will attempt to eliminate or reduce the amount of hallucinated content in the generated natural language answer, for example by deleting the $2^{nd}$ and the $3^{rd}$ sentences or by retrieving better context information and using it to regenerate a natural language answer with less hallucinated content.

Exemplary Question-Answering System

FIG. 2 shows an exemplary embodiment of a domain-specific, LLM-based QA system 100. In the illustrated embodiment, the QA system 100 includes a server 110 and one or more client devices 130. The client device 130 (which may also be referred to herein as a "personal electronic device") may be a desktop computer, a laptop, a smart phone, a tablet, a smart watch or other smart device. The client device 130 is configured to enable a user to ask a natural language question and transmit the question to the server 110 for processing. The server 110 is configured to receive the natural language question from the client device 130 and process the question to determine an appropriate answer, which is transmitted back the client device 130. The client device 130 is configured to receive the answer from the server 110 and to present the answer to the user.

The server 110 and the client device 130 are configured to communicate with one another via one or more networks 140. The network 140 can comprise one or more sub-networks that work in concert to enable communication between the server 110 and the client device 130. The network 140 may comprise, in part, one or more pre-existing wired or wireless networks such as local area networks, the Internet, telephony networks, or any combination thereof. It will be appreciated that, although the QA system 100 is described as having a distinct server 110 and client device 130, in some embodiments a single computing device (not shown) may include the combined components and features of both the server 110 and the client device 130

With continued reference to FIG. 2, exemplary components of the server 110 are shown. In the illustrated embodiment, the server 110 includes at least one processor 112, memory 114, a user interface 116, and a network communications module 118. It is appreciated that the illustrated embodiment of the server 110 is only one exemplary embodiment of a server 110 and is merely representative of any of various manners or configurations of a server, remote computer, or any other data processing systems that are operative in the manner set forth herein.

The processor 112 may be any of various processors as will be recognized by those of ordinary skill in the art. It will be recognized by those of ordinary skill in the art that a "processor" as used herein includes any hardware system, hardware mechanism or hardware component that processes data, signals, and/or other information. The processor 112 can include a system with a central processing unit, multiple processing units, dedicated circuitry for achieving functionality, and/or other systems. Exemplary processors include microprocessors (µP), microcontrollers (C), digital signal processors (DSP), graphics processing unit (GPU), or any combination thereof. The processor 112 is operably connected to the memory 114, the user interface 116, and the network communications module 118.

The server 110 may be operated locally or remotely by a user. To facilitate local operation, the server 110 may include the interactive user interface 116. Via the user interface 116, a user may modify and/or update program instructions stored on the memory 114, as well as collect data from and store data to the memory 114. In one embodiment, the user interface 116 may suitably include an LCD display screen or the like, a mouse or other pointing device, a keyboard or other keypad, speakers, and a microphone, as will be recognized by those of ordinary skill in the art. Alternatively, in some embodiments, a user may operate the server 110 remotely from another computing device which is in communication therewith via the network communications module 118 and has an analogous user interface.

The network communications module 118 of the server 110 provides an interface that allows for communication with any of various devices or networks and at least includes transceivers or other hardware configured to communicate with the client devices 30. In particular, the network communications module 118 may include a local area network port that allows for communication with any of various local computers housed in the same or nearby facility. In some embodiments, the network communications module 118 further includes a wide area network port that allows for communications with remote computers over the Internet.

Alternatively, the server 110 communicates with the Internet via a separate modem and/or router of the local area network. In one embodiment, the network communications module 118 is equipped with a Wi-Fi transceiver or other wireless communications device. Accordingly, it will be appreciated that communications with the server 110 may occur via wired communications or via the wireless communications. Communications may be accomplished using any of various known communications protocols.

The memory 114 of the server 110 is configured to store information, including both data and instructions. The memory 114 may be of any type of device capable of storing information accessible by the processor 112, such as a memory card, ROM, RAM, write-capable memories, read-only memories, hard drives, discs, flash memory, or any of various other computer-readable medium serving as data storage devices as will be recognized by those of ordinary skill in the art. The memory 114 is configured to store program instructions that, when executed by the processor 112, enable the server 110 to provide the features, functionality, characteristics and/or the like as described herein. Particularly, the memory 114 includes a question answering system backend 120, which includes a LLM, that enables processing natural language questions received from the client device 130 and determining an appropriate answer to the natural language question.

The memory 114 also stores an information source 122 that comprises a corpus of text information, which may relate to one or more particular knowledge domains to which the system 100 is applied. In some embodiments, the information source 122 may include a database having a large number of different documents, web pages, and the like converted into a text format. Alternatively, the information source 122 might include only a single comprehensive document or small number of documents for the particular knowledge domain to which the system 100 is applied. Thus, it should be appreciated that the nature of the information source 122 may vary significantly depending on the scope of the knowledge domain(s) to which the system 100 is applied.

With continued reference to FIG. 2, exemplary components of the client device 130 are shown. In the illustrated embodiment, the client device 130 comprises a processor 132, a memory 134, transceivers 136, a display screen 138, and a microphone 140. It is appreciated that the illustrated embodiment of the client device 130 is only one exemplary embodiment of a client device 130 and is merely representative of any of various manners or configurations of a client device, a personal electronic device, or other device that is operative in the manner set forth herein.

The processor 132 may be any of various processors as will be recognized by those of ordinary skill in the art. It will be recognized by those of ordinary skill in the art that a "processor" as used herein includes any hardware system, hardware mechanism or hardware component that processes data, signals, and/or other information. The processor 132 can include a system with a central processing unit, multiple processing units, dedicated circuitry for achieving functionality, and/or other systems. Exemplary processors include microprocessors (µP), microcontrollers (C), digital signal processors (DSP), graphics processing unit (GPU), or any combination thereof. The processor 132 is operably connected to the memory 134, the transceivers 136, the display screen 138, and the microphone 140.

The processor 132 is configured to operate and/or communicate with the display screen 138 and the microphone 140, as well as any other interfaces such as tactile buttons, switches, toggles, speakers, and/or connection ports. The display screen 138 may be an LCD screen or any of various other screens appropriate for a personal electronic device. The processor 132 operates the display screen 138 to visually display graphics, text, and other data to the user via the display screen 138. In some embodiments, the microphone 140 is configured to record the voice of a user asking a natural language question to be answered using the QA system 100. In further embodiments, the user types the natural language question using a virtual keyboard on the display screen 138 or a physical keyboard connected to the processor 132.

The transceivers 136 at least includes a transceiver, such as a Wi-Fi transceiver, configured to communicate with the server 110 via the network 140, but may also include any of various other devices configured for communication with other electronic devices, including the ability to send communication signals and receive communication signals. In one embodiment, the transceivers 136 further include additional transceivers which are common to smart phones, smart watches, laptop computers, tablet computers, desktop computers, such as Bluetooth transceivers, Ethernet adapters, and transceivers configured to communicate via wireless telephony networks.

The memory 134 of the server 110 is configured to store information, including both data and instructions. The memory 134 may be of any type of device capable of storing information accessible by the processor 132, such as a memory card, ROM, RAM, write-capable memories, read-only memories, hard drives, discs, flash memory, or any of various other computer-readable medium serving as data storage devices as will be recognized by those of ordinary skill in the art. The memory 134 is configured to store program instructions that, when executed by the processor 132, enable the client device 130 to provide the features, functionality, characteristics and/or the like as described herein. Particularly, the memory 134 includes a QA system application 142 that enables a user to ask a natural language question and to receive a corresponding answer to the natural language question provided from the server 110. It will be appreciated that the QA system application 142 may be natively executed application or a web application that is executed via a web browser.

Methods for Handling Hallucinated Content in a Question Answering System

A variety of operations and processes are described below for operating the server 110 and the client device 130 to provide a question answer system that better detects and handles hallucinated content. In these descriptions, statements that a method, processor, and/or system is performing some task or function refers to a controller or processor (e.g., the processor 112 of the server 110 or the processor 132 of the client device 130) executing programmed instructions stored in non-transitory computer readable storage media (e.g., the memory 120 of the server 110 or the memory 134 of the client device 130) operatively connected to the controller or processor to manipulate data or to operate one or more components in the server 110 and the client device 130 to perform the task or function. Additionally, the steps of the methods may be performed in any feasible chronological order, regardless of the order shown in the figures or the order in which the steps are described.

Figure 3:
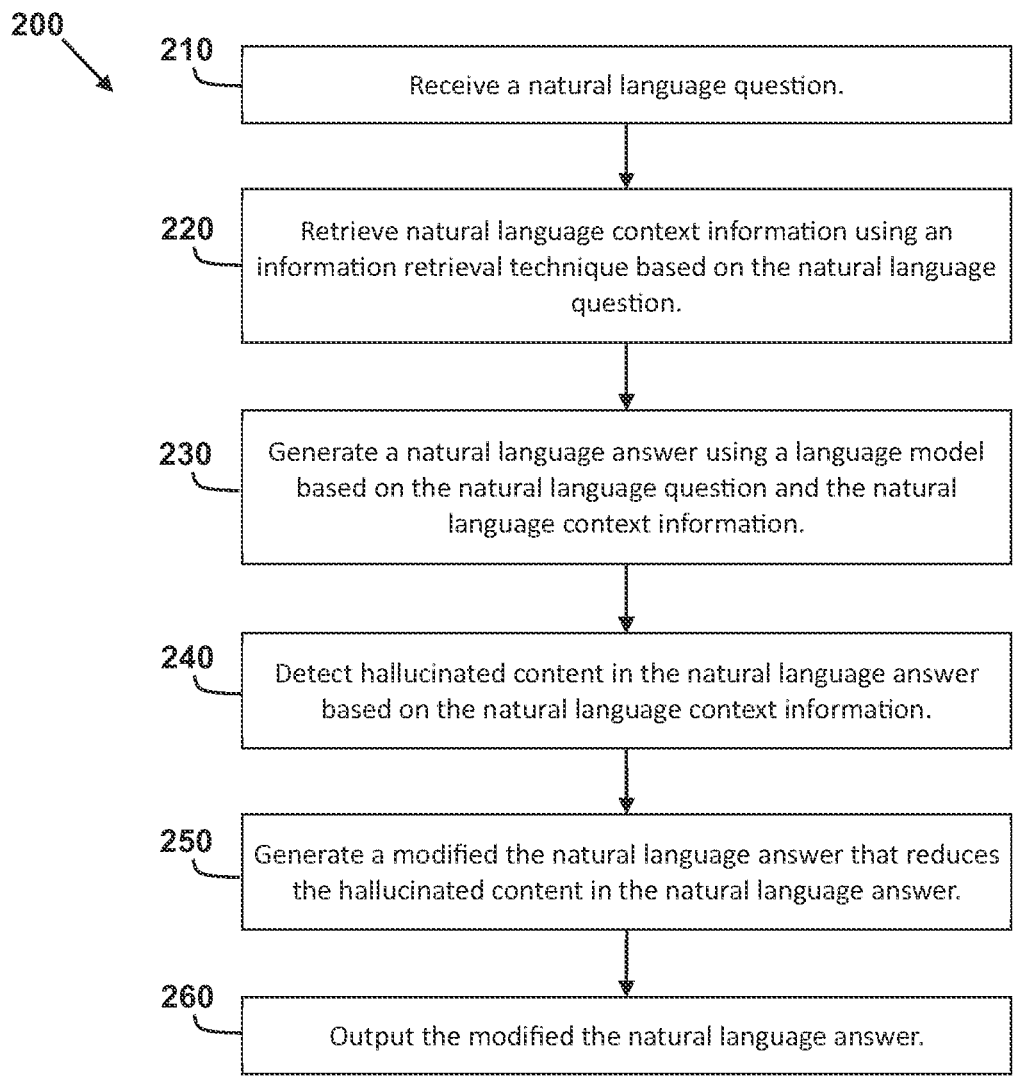
FIG. 3 shows a flow diagram for a method for handling hallucinated content in a question answering system.

FIG. 3 shows a flow diagram for a method 200 for handling hallucinated content in an LLM-based QA system. The method 200 advantageously leverages a set of hallucination detection and handling approaches that address different types of hallucinations of a QA system. In particular, the method 200 leverages sentence similarity estimation and keyword matching between the retrieved context information and the natural language answer to detect hallucinated content in the natural language answer. When hallucinated content is detected, the method 200 reduces the amount of hallucinated content in the natural language answer by removing hallucinated content or regenerating the natural language answer using better context information, depending on a level of hallucination in the natural language answer. Thus, the method 200 advantageously improves the reliability and trustworthiness of the LLM-based QA system.

The method 200 begins with receiving a natural language question (block 210). Particularly, the processor 112 receives a natural language question, e.g., from a user. In some embodiments, the processor 132 of the client device 130 executes program instructions of the question answering system application 142 to receive the natural language question from the user. In one embodiment, the processor 132 operates the display screen 138 to display a graphical user interface on the display screen 138, which includes a question prompt via which the user can type the natural language question in the form of text using a keyboard or the like. The processor 132 receives the text corresponding to the natural language question via a physical or virtual keyboard of the client device 130. Alternatively, the user might speak the natural language question into the microphone 140 and the processor 132 receives audio corresponding to the natural language question. In one embodiment, the processor 132 transcribes the received audio of the natural language question into a text form. Finally, the processor 132 operates the transceivers 136 to transmit the natural language question, either in text form or audio form, to the server 110 for processing. The processor 112 of the server 110 operates the network communication module 118 to receive the natural language question from the client device 130.

The method 200 continues with retrieving natural language context information using an information retrieval technique based on the natural language question (block 220). Particularly, the processor 112 retrieves natural language context information from the information source 122 based on the natural language question and using a respective information retrieval technique. The information retrieval techniques that are leveraged by the processor 112 are designed to retrieve natural language information that is relevant to an answer to the natural language question, referred to herein as the "context information."

As discussed above, the information source 122 may include a database having a large number of text documents and the like, or might include only a single comprehensive document or small number of documents for the particular knowledge domain to which the system 100 is applied. The retrieved context information may include, for example, one or more paragraphs of natural language text extracted from one or more sections of a document from the information source 122. Depending on the information retrieval technique, multiple paragraphs may be retrieved from the same section of the same document, from different sections of the same document, or from different sections of different documents.

It should be appreciated that a wide variety of information retrieval techniques, such as Lucene Search, can be leveraged to retrieve relevant context information from the information source 122. Different information retrieval techniques can provide varying qualities of retrieval results, with different computational expense. In general, information retrieval techniques that are more computationally expensive provide better retrieval results, whereas information retrieval techniques that are less computationally expensive provide lower quality retrieval results.

In at least some embodiments, the processor 112 selects an information retrieval technique from a plurality of available information retrieval techniques and performs the initial retrieval of natural language context information using the selected information retrieval technique. As will be discussed below, in some cases, the processor 112 will later perform the information retrieval again using a different information retrieval technique. In at least one embodiment, the processor 112 selects the least computationally expensive information retrieval technique for performing the initial information retrieval.

The method 200 continues with generating a natural language answer using a language model based on the natural language question and the natural language context information (block 230). Particularly, the processor 112 generates a natural language answer using a language model based on the natural language question and the natural language context information. The language model is, for example, a so-called 'large language model' (LLM), such as OpenAI's GPT language models, configured to generate natural language output text based on natural language input text, and which has been trained on a very large amount of training texts. In at least some embodiments, the language model incorporates an artificial neural network.

In some embodiments, the processor 112 constructs a natural language prompt based on the natural language question and the natural language context information, that is designed to solicit an answer from the language model that is constrained based on the natural language context information. The processor 112 generates the natural language answer by providing the natural language prompt to the language model as input. With reference back to FIG. 1, the prompt 10 was generated by including additional text (e.g., "Given the context:") identifying the natural language context information in the prompt 10, followed by the text of the natural language context information. Similarly, the prompt 10 was the prompt 10 was generated by including additional text (e.g., "Answer the following question:") identifying the natural language question in the prompt 10, followed by the text of the natural language question. However, it should be appreciated that the prompt can be constructed in a wide variety of ways that incorporate and identify both the natural language question and the natural language context information, which will lead to variances in generated answers and may depend on the language model that is leveraged in the QA system 100.

The method 200 continues with detecting hallucinated content in the natural language answer based on the natural language context information (block 240). Particularly, the processor 112 detects hallucinated content in the natural language answer based on previously retrieved natural language context information. In general, the processor 112 detects the hallucinated content in the natural language answer by comparing sentences and/or keywords in the natural language answer with sentences and words in the previously retrieved natural language context information. However, a variety of specification hallucination detection techniques are described in detail below.

In a sentence similarity-based hallucination detection technique, the processor 112 determines a similarity between sentences in the natural language answer and sentences in the natural language context information. Next, the processor 112 labels one or more sentences in the natural language answer as being hallucinated content in response to the sentence having less than a threshold similarity with every sentence in the natural language context information.

Figure 4:
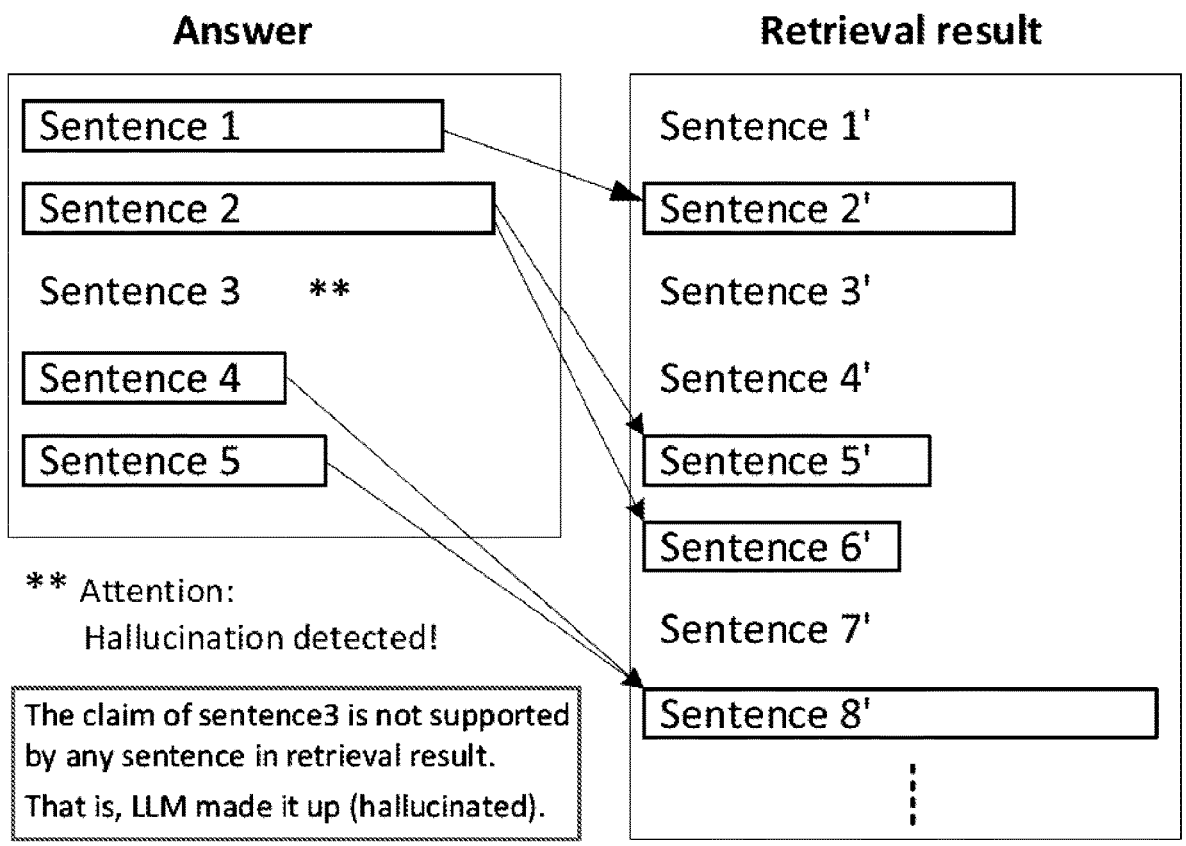
FIG. 4 summarizes the process for the sentence similarity-based hallucination detection technique.

FIG. 4 summarizes the process for the sentence similarity-based hallucination detection technique. Each sentence of the natural language answer is compared with sentences in the natural language context information to identify one or more sentences therein that provide support for the sentence in the natural language answer. In the illustration, similarity sentences in the natural language answer and the natural language context information are represented with an arrow. As can be seen, among the five sentences in the answer, the $1^{st}$ sentence is found to be supported by (similar to) the $2^{nd}$ sentence in the context information, the $2^{nd}$ sentence is supported by the $5^{th}$ and $6^{th}$ sentences in the context information, and both the $4^{th}$ and $5^{th}$ sentences are supported by the $8^{th}$ sentence in the context information. However, the $3^{rd}$ sentence is found unsimilar to any sentence in the context information, and is thus labeled as hallucinated content.

The basic idea of the sentence similarity-based hallucination detection technique is to determine whether each sentence in the natural language answer is grounded on or supported by the retrieval result, i.e., the natural language context information. If a sentence is not supported by the retrieval result, then it is likely hallucinated or, in other words, the language model made it up. In at least some embodiments, the processor 112 leverages two different types of similarity evaluation to determine whether or not a sentence in the natural language answer is similar to (i.e., grounded on) one or more sentences in the natural language context information. Particularly, the processor 112 utilizes a sentence embedding-based similarity calculation and a pattern overlapping rate-based similarity calculation. The processor 112 uses these two types of similarity evaluations in a hybrid manner to make a joint decision as to whether or not a particular sentence in the natural language answer is grounded on the natural language context information. If not, the processor 112 labels the sentence as hallucinated content.

In the sentence embedding-based similarity calculation, the processor 112 determines a respective sentence embedding (e.g., a vector) for each for each sentence in the natural language answer and for each sentence in the natural language context information. The processor 112 leverages a language model and/or an encoder thereof to generate each of the sentence embeddings. However, it should be appreciated that the language model used to generate the sentence embedding vector is not necessarily the same language model that is used to generate the natural language answer. In one example, a first language model (e.g., OpenAI's GPT) might be used to generate the natural language answer, and a second language model (e.g., Sentence-BERT) might be used to generate the sentence embeddings needed for sentence similarity determinations. In at least one embodiment, the second language model used to generate the sentence embeddings is higher efficiency and lower cost compared to the first language model used to generate the natural language answer.

For each sentence in the natural language answer, the processor 112 determines a respective embedding similarity with each sentence in the natural language context information based on a comparison of the respective sentence embeddings. In at least one embodiment, the processor 112 determines the embedding similarity between each combination of sentences by calculating a cosine similarity between the respective sentence embeddings. In response to a pair of sentences having an embedding similarity that exceeds a first predetermined threshold (Threshold_A), the processor 112 identifies and/or labels the pair of sentences as being similar to one another. This predetermined threshold may be tuned on a development dataset.

It will be appreciated however that, in some cases, a sentence in the natural language answer may combine multiple sentences from the natural language context information. Likewise, in some cases, one sentence from the natural language context information might be divided into multiple sentences in the natural language answer. This situation, in which there is a one-to-multiple or multiple-to-one mapping between sentences in the natural language answer and sentences in the natural language context information, is not addressed well by the sentence embedding-based similarity calculation. Particularly, the sentence embeddings in this situation might not be all that similar to one another, even though the sentences support one another, because the longer sentence may contain significant extra information in it compared to the shorter sentence. In such cases, the pattern overlapping rate-based similarity calculation helps to capture such partial similarity between the sentences.

In the pattern overlapping rate-based similarity calculation, the processor 112 determines, using dynamic programming with an objective to maximize overlap, a respective mapping between words in the respective sentence in the natural language answer and words the respective in the natural language context information. The dynamic programming compares the two sentences in focus with the objective to maximize the overlap, outputting an optimal path (e.g., 0011111001111001000000, where 1 represents a word match, 0 otherwise) which contains the mapping result for each step. Next, the processor 112 determines a word pattern overlap rate between the respective sentence in the natural language answer and the respective in the natural language context information based on the determined mapping and/or optimal path.

More particularly, the processor 112 first determines an overlap length based on determined mapping and/or optimal path as a sum of overlapping words between the respective sentence in the natural language answer and the respective in the natural language context information. In one embodiment, the processor 112 determines the sum of overlapping words as a total number of overlapping words (i.e., the sum of is in the optimal path). In an alternative embodiment, the processor 112 determines the sum of overlapping words as only including words in overlapping phrases (i.e., sequences of overlapping words) having at least a predetermined minimum number of words (e.g., overlapping phrases having at least 4 words). In at least one embodiment, the predetermined minimum number of words is a predetermined percentage (e.g., 30%) of the number of words in a shorter sentence of the respective sentence in the natural language answer and the respective in the natural language context information. In this way, relatively short overlap phrases (e.g., high-frequency words such as "the") are ignored to reduce the influence of noise.

Finally, the processor 112 determines the word pattern overlap rate by dividing the respective overlap length by the number of words in a shorter sentence of the respective sentence in the natural language answer and the respective in the natural language context information. In this way, the word pattern overlap is defined independently of the differing lengths of the sentences and resolves the issue discussed above in which there is a one-to-multiple or multiple-to-one mapping between sentences in the natural language answer and sentences in the natural language context information.

In response to a pair of sentences having a word pattern overlap rate that exceeds a second predetermined threshold (Threshold_B), the processor 112 identifies and/or labels the pair of sentences as being similar. This predetermined threshold may be tuned on a development dataset.

As noted above, in at least some embodiments, the processor 112 utilizes both the sentence embedding-based similarity calculation and the pattern overlapping rate-based similarity calculation in a hybrid manner to make a joint decision as to whether or not a particular sentence in the natural language answer is hallucinated. The two types of similarity calculations have different circumstances in which they are most useful. The sentence embedding-based similarity calculation can handle the mapping of one sentence in the natural language answer with another sentence in the natural language context information, whereas the pattern overlapping rate-based similarity calculation is good at handling the situation of one to-multiple or multiple-to-one sentence mapping. As they have complementary advantages, they are advantageously combined into a hybrid hallucination detection approach.

FIG. 5 shows pseudocode that summarizes the sentence similarity-based hallucination detection technique. Particularly, for each sentence in the natural language answer (sen_A), for each sentence in the natural language context information (denoted as sen_C), the processor 112 determines an embedding similarity using the sentence embedding-based similarity calculation and a word pattern overlap rate using the pattern overlapping rate-based similarity calculation. If the sentence embedding-based similarity calculation results in an embedding similarity that exceeds the first predetermined threshold (Threshold_A), then the processor 112 identifies and/or labels sentences (sen_A and sen_C) as being similar. Elsewise, if the pattern overlapping rate-based similarity calculation results in a word pattern overlap rate that exceeds the second predetermined threshold (Threshold_B), then the processor 112 identifies and/or labels sentences (sen_A and sen_C) as being similar. Elsewise, the processor 112 identifies and/or labels sentences (sen_A and sen_C) as being unsimilar. If the sentence in the natural language answer (sen_A) is not similar to any sentence in the natural language context information, then the processor 112 identifies and/or labels sentence in the natural language answer (sen_A) as being hallucinated content. In other words, the processor 112 identifies and/or labels a respective sentence in the natural language answer as being hallucinated content in response to (i) the embedding similarity with every sentence in the natural language context information being less than the first predetermined threshold (Threshold_A) and (ii) the word pattern overlap rate with every sentence in the natural language context information being less than the second predetermined threshold (Threshold_B).

In contrast with the sentence similarity-based hallucination detection technique, which detects hallucinated content on a sentence-by-sentence level, a keyword-based hallucination detection technique is also provided that detects whether natural language answer as a whole is heavily hallucinated or not.

In the keyword-based hallucination detection technique, the processor 112 identifies keywords in the natural language answer and determines whether the keywords are also present in the natural language context information. Next, the processor 112 labels the natural language answer as including hallucinated content if at least a predetermined threshold amount of the keywords are not present in the natural language context information. The predetermined threshold amount may be a fixed number of keywords or a percentage of all of the keywords found in the natural language answer.

The main idea of the keyword-based hallucination detection technique is that, given a natural language answer generated by the language model, if a significant portion of the keywords in the answer do not exist in the natural language context information, it is very likely that the language model substantially hallucinated the answer (i.e., it is not supported by the natural language context information). The effectiveness of this approach depends on the accuracy and efficiency of the keyword extraction technique. If the keyword-extraction technique adopted can reliably detect keywords with high efficiency, this keyword-based hallucination detection technique can be more robust and efficient than the one in the sentence similarity-based hallucination detection technique for the detection of highly hallucinated answer.

FIG. 6 shows pseudocode that summarizes the keyword-based hallucination detection technique. Particularly, the processor 112 extracts keywords from the natural language answer using a state-of-the-art keyword extraction technique. For each extracted keyword in natural language answer, the processor 112 identifies and/or labels the keyword as a potentially hallucinated keyword if the keyword does not occur in the natural language context information. If a ratio of a number of potentially hallucinated keywords and number of total keywords is larger than a predetermined threshold, then the processor 112 identifies and/or labels the natural language answer as a whole to be heavily hallucinated.

In at least some embodiments, the keyword-based hallucination detection technique is combined with the previously discussed sentence similarity-based hallucination detection technique. Particularly, in some embodiments, the processor 112 first performs the keyword-based hallucination detection technique to determine whether the natural language answer as a whole is heavily hallucinated. If the natural language answer as a whole is heavily hallucinated, the hallucination detection can stop there. However, if the natural language answer as a whole is not heavily hallucinated according to the keyword-based hallucination detection technique, then the processor 112 subsequently performs the sentence similarity-based hallucination detection technique to determine whether individual sentences in the natural language answer are hallucinated.

Returning to FIG. 3, the method 200 continues with generating a modified the natural language answer that reduces the hallucinated content in the natural language answer (block 250). Particularly, when the natural language answer is determined to include hallucinated content, the processor 112 generates a modified natural language answer that reduces the hallucinated content in the natural language answer. In some embodiments, the processor 112 generates the modified natural language answer by deleting the hallucinated content from the natural language answer. Alternatively, or in addition, in some embodiments, the processor 112 retrieves modified natural language context information using a different information retrieval technique and generates the modified natural language answer using the language model based on the natural language question and the modified natural language context information.

In a sentence similarity-based hallucination handling technique, in combination with sentence similarity-based hallucination detection technique, the modified natural language context information can be generated in a manner depending on a hallucination level of the natural language answer. If the answer is only mildly hallucinated, the processor 112 deletes the detected hallucinated sentences from the answer. However, if the answer is heavily hallucinated, it usually indicates that the LLM cannot find sufficient information from the retrieval result so that it makes something up to make the answer look probable. In this case, the processor 112 switches to a better (likely more computationally expensive) information retrieval technique and re-runs the information retrieval, prompt construction, and LLM-based answer generation. This procedure is repeated until the modified natural language answer includes less than a threshold amount of hallucinated content or until no further information retrieval techniques result a reduced amount of the hallucinated content in the modified natural language answer.

FIG. 7 shows pseudocode that summarizes the sentence similarity-based hallucination handling technique. Particularly, given the natural language question, the processor 112 generates the natural language answer using natural language context information retrieved using a baseline information retrieval technique. Next, the processor 112 determines a hallucination level that classifies an amount of the hallucinated content in the natural language answer. In one embodiment, the hallucination level is a count of how many or what percentage of the sentences in the natural language answer are hallucinated.

While hallucinated content is detected in the natural language answer, if the hallucination level is less than a predetermined threshold (e.g., less than 30% of the sentences), indicating that the natural language answer is only mildly hallucinated, the processor 112 generates the modified natural language answer by deleting the hallucinated sentences from the natural language answer and the shortened natural language answer is provided as the final modified natural language answer.

Elsewise, if the hallucination level is greater than the predetermined threshold (e.g., greater than 30% of the sentences), indicating that the natural language answer is heavily hallucinated, and if there remains a better/different information retrieval technique available, the processor 112 retrieves modified natural language context information using the better/different information retrieval technique and regenerates the natural language answer using the language model based on the natural language question and the modified natural language context information. The process is repeated with the regenerated natural language answer until the hallucination level is less than the predetermined threshold (e.g., less than 30% of the sentences), indicating that the natural language answer is only mildly hallucinated, or until there are no longer any better/different information retrieval techniques available. In either case, the processor 112 then finally generates the modified natural language answer by deleting the hallucinated content from the natural language answer and the shortened natural language answer is provided as the final modified natural language answer.

In a keyword-based hallucination handling technique, in combination with keyword-based hallucination detection technique, a modified natural language answer can be generated by regenerating modified natural language context information using a better/different information retrieval technique. Particularly, if the answer is heavily hallucinated, the processor 112 switches to a better (likely more computationally expensive) information retrieval technique and re-runs the information retrieval, prompt construction, and LLM-based answer generation. This procedure is repeated until no hallucination is detected in the generated answer or no better retriever is available anymore.

FIG. 8 shows pseudocode that summarizes the sentence similarity-based hallucination handling technique. Particularly, given the natural language question, the processor 112 generates the natural language answer using natural language context information retrieved using a baseline information retrieval technique. While hallucinated content is detected in the natural language answer, if there remains a better/different information retrieval technique available, the processor 112 retrieves modified natural language context information using the better/different information retrieval technique and regenerates the natural language answer using the language model based on the natural language question and the modified natural language context information. The process is repeated with the regenerated natural language answer until the natural language answer is no longer heavily hallucinated (i.e., no longer has the predetermined threshold amount of the hallucinated keywords), or until there are no longer any better/different information retrieval techniques available.

In at least some embodiments, the keyword-based hallucination detection and handling techniques are combined with the sentence similarity-based hallucination detection and handling techniques. Particularly, the sentence similarity-based techniques and the keyword-based techniques have complementary advantages. That is, the keyword-based techniques can be advantageous for the detection of heavily hallucinated answer in an efficient manner, whereas the sentence similarity-based techniques can detect/handle lightly hallucinated answers. Thus, it is advantageous to combine the sentence similarity-based techniques and the keyword-based techniques into a hybrid hallucination-handling framework, which can efficiently detect heavy hallucination cases and, at the same time, can also handle lightly hallucinated cases.

Figure 9:
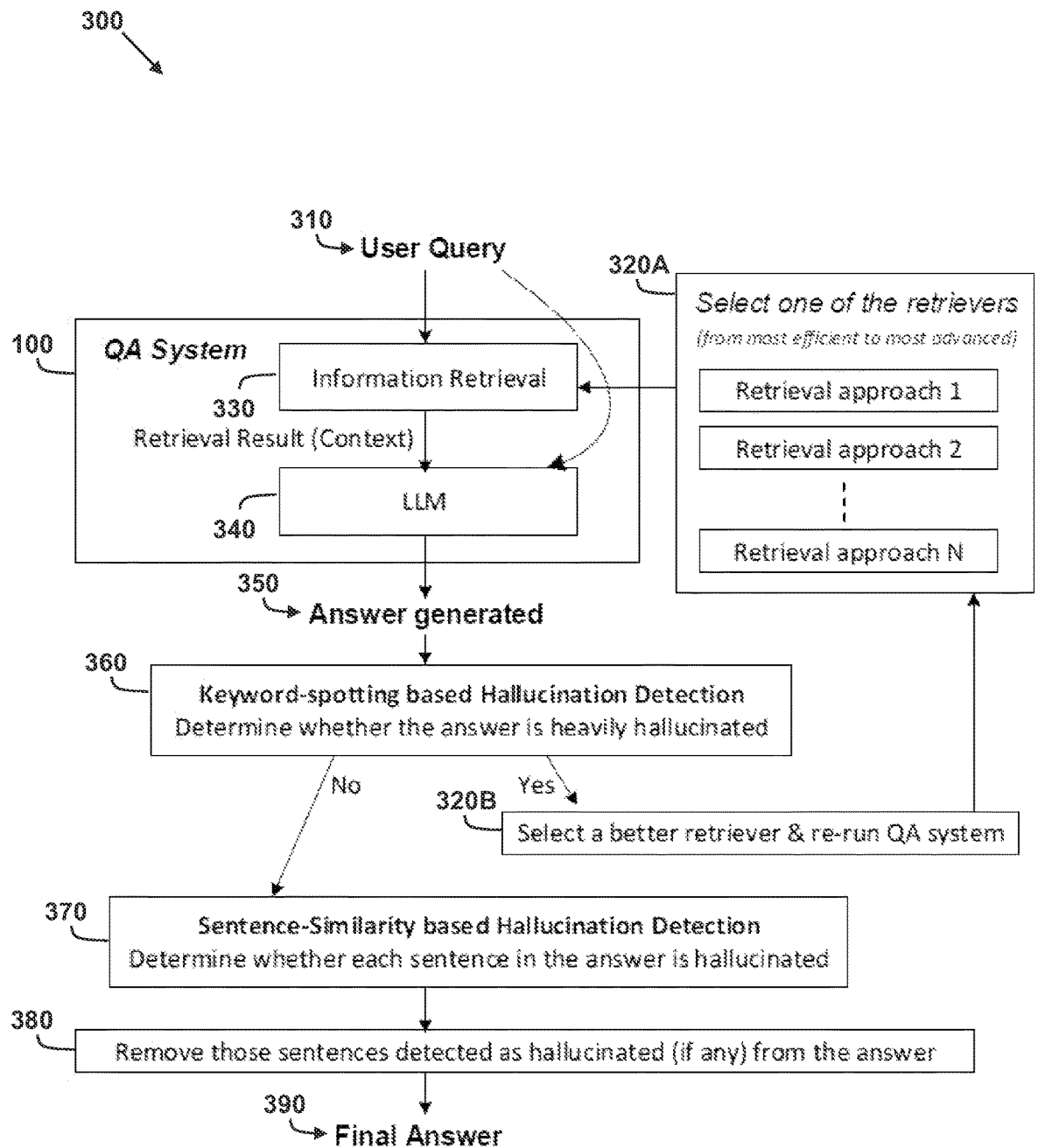
FIG. 9 shows a flow diagram summarizing a hybrid hallucination-handling framework.

FIG. 9 shows a flow diagram summarizing a hybrid hallucination-handling framework 300 that incorporates both sentence similarity-based and keyword-based hallucination detection and handling. As similarly discussed above, given a user query 310 (i.e., a natural language question), the processor 112 selects a baseline information retrieval technique, e.g., a most efficient retrieval approach (block 320A), performs the information retrieval using the baseline information retrieval technique (block 330), and generates a natural language answer 350 using the language model (block 340). After the natural language answer 350 is generated, the processor 112 performs the keyword-based hallucination detection to determine whether the natural language answer as a whole is heavily hallucinated (block 360). If the natural language answer 350 is determined to be heavily hallucinated on the basis of the keyword-based hallucination detection, then the processor 112 selects a different information retrieval technique, e.g., a better but less efficient retrieval approach (block 320B). Otherwise, if the natural language answer 350 is not determined to be heavily hallucinated on the basis of the keyword-based hallucination detection, then the processor 112 performs the sentence similarity-based hallucination detection to determine whether each sentence in the natural language answer is hallucinated (block 370). Finally, the processor 112 removes sentences from the natural language answer that were determined to be hallucinated (block 380). The resulting shortened natural language answer is provided as the final modified natural language answer (block 390).

With the hybrid framework of FIG. 9, the hallucination problem related to LLM-based answer generation will be greatly relieved. At the same time, high system efficiency can be maintained due to two factors. Firstly, the computationally expensive and better information retrieval technique will only be applied when needed (i.e., when heavy hallucination is detected). Secondly, the combined usage of keyword and similarity-based hallucination detection can further improve the overall efficiency of hallucination detection. Particularly, the keyword-based hallucination detection, which is typically more efficient, is applied first to identify the need for using a better information retrieval technique. Then, the sentence similarity-based hallucination detection is applied subsequently to eliminate any remaining hallucinated content from the natural language answer.

Returning to FIG. 3, the method 200 continues with outputting the modified natural language answer (block 260). Particularly, at least one user interface device is operated to output the final modified natural language answer to a user (e.g., the user who provided the natural language question). In some embodiments, a speaker is operated to output the final modified natural language answer in audio form using. In some embodiments, a display screen is operated to display the final modified natural language answer in graphical form.

In at least some embodiments, the processor 112 of the server 110 operates the network communication module 118 to transmit the final modified natural language answer to the client device 130. The processor 132 of the client device 130 operates the transceivers 136 to receive the final modified natural language answer from the server 110. The processor 132 operates at least one output device to perceptibly output the final modified natural language answer to the user. In one embodiment, the processor 132 operates the display screen 138 to display a graphical user interface on the display screen 138, which includes the final modified natural language answer in graphical form. In one embodiment, the processor 132 operates a speaker of the client device 130 to read the natural language text string aloud using a text-to-speech engine.

In some embodiments, in addition to generating the final modified natural language answer, the QA system 100 is also configured to provide information that identifies which sentences in the natural language context information provide support for each sentence in the final modified natural language answer. Indications of the supporting sentences in the natural language context information are output to the user, alongside the natural language answer, in the same manner discussed above with respect to outputting the natural language answer (i.e., transmitted to the client device 130 and output via a speaker or display screen). This advantageously offers traceability for a domain-specific QA system and provides useful insights to users.

When performing the sentence similarity-based hallucination detection in the manner discussed above, the processor 112 identifies and/or labels sentences in the natural language answer and the natural language context information that are similar to one another. Additionally, in some embodiments, the processor 112 determines a similarity score for each pairing of sentences (e.g., based on the cosine similarity and/or word pattern overlap rate). Based on these previous similarity determinations and/or similarity scores, the processor 112 identifies sentences in the natural language context information that provide support for sentences in the modified natural language sentence. Particularly, in one embodiment, sentences in the natural language context information that are determined to be similar to a particular sentence in the final modified natural language answer are considered to support that sentence in the final modified natural language answer. Alternatively, in another embodiment, sentences in the natural language context information that have a similarity score greater than a predetermined threshold to a particular sentence in the final modified natural language answer are considered to support that sentence in the final modified natural language answer.

FIG. 10 shows pseudocode that summarizes the sentence similarity-based hallucination handling technique. Particularly, for each sentence in the natural language answer (sen_A), for each sentence in the natural language context information (denoted as sen_C), the processor 112 determines an embedding similarity using the sentence embedding-based similarity calculation and a word pattern overlap rate using the pattern overlapping rate-based similarity calculation. If the sentence embedding-based similarity calculation results in an embedding similarity that exceeds the first predetermined threshold (Threshold_A), then the processor 112 identifies and/or labels sentence in the natural language context information (sen_C) as supporting the sentence in the natural language answer (sen_A). Elsewise, if the pattern overlapping rate-based similarity calculation results in a word pattern overlap rate that exceeds the second predetermined threshold (Threshold_B), then the processor 112 identifies and/or labels sentence in the natural language context information (sen_C) as supporting the sentence in the natural language answer (sen_A). Finally, the supporting sentences or indications thereof in the natural language context information are output to the user, as discussed above.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of answering natural language questions, the method comprising:
   receiving, with a processor, a natural language question;
   retrieving, with the processor, natural language context information from an information source using a first information retrieval technique based on the natural language question;
   generating, with the processor, a natural language answer using a language model based on the natural language question and the natural language context information; and
   detecting, with the processor, hallucinated content in the natural language answer based on the natural language context information, the detecting the hallucinated including (i) comparing the natural language answer with the natural language context information, (ii) determining similarities between sentences in the natural language answer and sentences in the natural language context information, and (iii) labelling at least one sentence in the natural language answer as the hallucinated content in response to the at least one sentence having less than a threshold similarity with every sentence in the natural language context information.

2. The method according to claim 1, the determining the similarities further comprising:
   determining a sentence embedding for each sentence in the natural language answer;
   determining a sentence embedding for each sentence in the natural language context information; and
   determining, for each respective sentence in the natural language answer, a respective embedding similarity between the respective sentence in the natural language answer and each respective sentence in the natural language context information, based on the sentence embedding for the respective sentence in the natural language answer and the sentence embedding for the respective sentence in the natural language context information.

3. The method according to claim 2, the determining the respective embedding similarity further comprising:
   determining a respective cosine similarity between the sentence embedding for the respective sentence in the natural language answer and the sentence embedding for the respective sentence in the natural language context information.

4. The method according to claim 2, the determining the similarities further comprising:
   determining, for each respective sentence in the natural language answer, a respective word pattern overlap rate between the respective sentence in the natural language answer and each respective sentence in the natural language context information.

5. The method according to claim 4, the determining the respective word pattern overlap rate further comprising:
   determining a respective mapping between the respective sentence in the natural language answer and the respective in the natural language context information; and
   determining the respective word pattern overlap rate between the respective sentence in the natural language answer and the respective in the natural language context information based on the respective mapping.

6. The method according to claim 5, the determining the respective word pattern overlap rate further comprising:
   determining a respective overlap length as a sum of overlapping words between the respective sentence in the natural language answer and the respective in the natural language context information; and
   determining the respective word pattern overlap rate between the respective sentence in the natural language answer and the respective in the natural language context information by dividing the respective overlap length by a number of words in a shorter sentence of the respective sentence in the natural language answer and the respective in the natural language context information.

7. The method according to claim 6, the determining the respective overlap length further comprising:
   determining sum of overlapping words between the respective sentence in the natural language answer and the respective in the natural language context information as only including words in a sequence of overlapping words having at least a predetermined minimum number of words.

8. The method according to claim 4, the labelling the at least one sentence in the natural language answer as the hallucinated content further comprising:
   labelling the at least one sentence in the natural language answer as the hallucinated content in response to:
   (i) the respective embedding similarity between the at least one sentence in the natural language answer and each sentence in the natural language context information being less than a first predetermined threshold; and
   (ii) the respective word pattern overlap rate between the at least one sentence in the natural language answer and each sentence in the natural language context information being less than a second predetermined threshold.

9. The method according to claim 1, the detecting the hallucinated content further comprising:
   identifying keywords in the natural language answer;
   determining whether the keywords are also present in the natural language context information; and
   labelling the natural language answer as including the hallucinated content in response an amount of the keywords in the natural language answer not being present in the natural language context information exceeding a third predetermined threshold.

10. The method according to claim 1 further comprising:
    generating, with the processor, a modified natural language answer that reduces the hallucinated content in the natural language answer.

11. The method according to claim 10, the generating the modified the natural language answer further comprising:
    generating the modified natural language answer by deleting the hallucinated content from the natural language answer.

12. The method according to claim 11 further comprising:
    determining, with the processor, a hallucination level that quantifies an amount of the hallucinated content in the natural language answer,
    wherein the deleting the hallucinated content from the natural language answer is performed in response to the hallucination level being less than a predetermined threshold.

13. The method according to claim 10, the generating the modified the natural language answer further comprising:
    retrieving modified natural language context information using a second information retrieval technique based on the natural language question, the second information retrieval technique being different than the first information retrieval technique; and generating the modified natural language answer using the language model based on the natural language question and the modified natural language context information.

14. The method according to claim 13 further comprising:

determining, with the processor, a hallucination level that classifies an amount of the hallucinated content in the natural language answer, wherein the retrieving modified natural language context information and the generating the modified natural language answer based on the modified natural language context information are performed in response to the hallucination level being greater than a predetermined threshold.

15. The method according to claim 13, wherein the retrieving modified natural language context information and the generating the modified natural language answer based on the modified natural language context information are repeated using different information retrieval techniques in each case, until the modified natural language answer includes less than a threshold amount of hallucinated content.

16. The method according to claim 13, wherein the retrieving modified natural language context information and the generating the modified natural language answer based on the modified natural language context information are repeated using different information retrieval techniques in each case, until no further information retrieval techniques result a reduced amount of the hallucinated content in the modified natural language answer.

17. The method according to claim 10 further comprising:

outputting, with an output device, the modified natural language answer to a user.

18. The method according to claim 17 further comprising:

identifying, with the processor, sentences in the natural language context information that provide support for sentences in the modified natural language answer; and outputting, with the output device, indications of the sentences in the natural language context information that provide support for sentences in the modified natural language answer.

19. A method of answering natural language questions, the method comprising:

receiving, with a processor, a natural language question;

retrieving, with the processor, natural language context information from an information source using a first information retrieval technique based on the natural language question;

generating, with the processor, a natural language answer using a language model based on the natural language question and the natural language context information; and detecting, with the processor, hallucinated content in the natural language answer based on the natural language context information, the detecting the hallucinated including (i) comparing the natural language answer with the natural language context information, (ii) identifying keywords in the natural language answer, (iii) determining whether the keywords are also present in the natural language context information, and (iv) labelling the natural language answer as including the hallucinated content in response an amount of the keywords in the natural language answer not being present in the natural language context information exceeding a third predetermined threshold.

20. A method of answering natural language questions, the method comprising:

receiving, with a processor, a natural language question;

retrieving, with the processor, natural language context information from an information source using a first information retrieval technique based on the natural language question;

generating, with the processor, a natural language answer using a language model based on the natural language question and the natural language context information;

detecting, with the processor, hallucinated content in the natural language answer based on the natural language context information; and generating, with the processor, a modified natural language answer that reduces the hallucinated content in the natural language answer, the generating the modified the natural language answer further including (i) retrieving modified natural language context information using a second information retrieval technique based on the natural language question, the second information retrieval technique being different than the first information retrieval technique, and (ii) generating the modified natural language answer using the language model based on the natural language question and the modified natural language context information.

* * * * *